(12) United States Patent  
Gonzalez et al.

(10) Patent No.: US 8,931,162 B2  
(45) Date of Patent: Jan. 13, 2015

(54) THREE PIECE FLOOR MAT RETENTION SYSTEM

(71) Applicant: International Automotive Components Group North America, Inc., Southfield, MI (US)

(72) Inventors: Orlando A. Gonzalez, South Lyon, MI (US); Greg Conley, Belleville, MI (US); Loretta T. Clemons, Farmington Hills, MI (US); Bryn Davies, Novi, MI (US); Michelle L. Schneider, Northville, MI (US); Colleen M. Maraffino, Northville, MI (US)

(73) Assignees: International Automotive Components Group North America, Inc., Dearborn, MI (US); Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/172,712

(22) Filed: Feb. 4, 2014

(65) Prior Publication Data

US 2014/0215802 A1 Aug. 7, 2014

Related U.S. Application Data

(63) Continuation of application No. 12/271,148, filed on Nov. 14, 2008, now abandoned.

(51) Int. Cl.
- *B23P 11/00* (2006.01)
- *A44B 13/00* (2006.01)
- *A44B 1/18* (2006.01)
- *A47G 27/04* (2006.01)
- *B23P 19/04* (2006.01)

(52) U.S. Cl.
CPC ..................... *B23P 19/04* (2013.01)
USPC .................. 29/525.01; 29/525.02; 29/525.11; 29/453; 16/4; 16/5; 16/6; 16/7; 24/598.2; 24/694; 24/682.1

(58) Field of Classification Search
CPC .......... F16B 5/06; F16B 21/073; F16B 21/06; F16B 21/02; B60R 22/22; A44B 11/2561; A44B 13/0052; A44B 19/16; E04F 19/04; A47G 27/0406; A47G 27/0425; A47G 27/0418; B60N 3/046; F16L 21/065; B23P 19/10; B23P 21/002; B25B 27/0092
USPC .................... 29/525.01, 525.02, 453, 525.11; 16/4–7; 24/591.1, 592.1, 593.1, 24/594.11, 596.1, 598.2, 581.11, 682.1, 24/686, DIG. 32, DIG. 35
See application file for complete search history.

(56) References Cited

U.S. PATENT DOCUMENTS

| | | | | |
|---|---|---|---|---|
| 3,074,675 A | * | 1/1963 | Brown | 248/74.3 |
| 3,208,095 A | * | 9/1965 | Hill | 16/16 |
| 3,930,084 A | * | 12/1975 | Shields | 428/67 |
| 4,086,679 A | * | 5/1978 | Butler | 16/4 |
| 4,403,895 A | * | 9/1983 | Caldwell et al. | 411/378 |

(Continued)

*Primary Examiner* — Jermie Cozart  
*Assistant Examiner* — Bayan Salone  
(74) *Attorney, Agent, or Firm* — Grossman, Tucker, Perreault & Pfleger, PLLC

(57) ABSTRACT

A three piece fastener is provided for attaching two layers, e.g. a floor mat for a vehicle to a floor carpet which may then stabilize the mat relative to the carpeting. The three components may connect together through a combination of mechanical connections to provide a relatively simple and cost effective solution to floor mat retention.

9 Claims, 2 Drawing Sheets

(56) References Cited

U.S. PATENT DOCUMENTS

| | | | |
|---|---|---|---|
| 4,406,033 A * | 9/1983 | Chisholm et al. | 16/4 |
| 4,425,690 A * | 1/1984 | Fraser et al. | 24/351 |
| 4,481,240 A | 11/1984 | Roth | |
| 4,588,628 A * | 5/1986 | Roth | 428/85 |
| 4,632,438 A * | 12/1986 | McKinney | 292/87 |
| 4,673,603 A * | 6/1987 | Roth | 428/85 |
| 4,692,364 A * | 9/1987 | Altus | 428/85 |
| 4,758,457 A * | 7/1988 | Altus | 428/82 |
| 4,789,201 A * | 12/1988 | Selbert | 297/218.1 |
| 4,829,627 A * | 5/1989 | Altus et al. | 16/4 |
| 4,860,402 A * | 8/1989 | Dichtel | 16/4 |
| 4,878,792 A * | 11/1989 | Frano | 411/339 |
| 4,921,742 A * | 5/1990 | Altus | 428/81 |
| 4,944,612 A * | 7/1990 | Abstetar et al. | 296/39.2 |
| 5,192,599 A * | 3/1993 | Sakamoto | 428/82 |
| 5,537,725 A * | 7/1996 | Takahashi | 24/615 |
| 5,636,408 A * | 6/1997 | Dichtel | 16/6 |
| 5,775,859 A * | 7/1998 | Anscher | 411/38 |
| 6,155,629 A * | 12/2000 | Sherman | 296/97.23 |
| 6,244,802 B1 * | 6/2001 | Stanesic et al. | 410/94 |
| 6,264,413 B1 * | 7/2001 | Bisping et al. | 411/372.6 |
| 6,347,431 B1 * | 2/2002 | Gratowski et al. | 16/4 |
| 6,381,806 B1 * | 5/2002 | Stanesic et al. | 16/4 |
| 6,497,003 B2 * | 12/2002 | Calabrese | 16/4 |
| 6,591,646 B1 * | 7/2003 | Huang | 70/456 R |
| 6,606,769 B1 * | 8/2003 | Harris | 24/599.2 |
| 6,708,933 B2 * | 3/2004 | Girodo | 248/74.2 |
| 6,713,895 B1 * | 3/2004 | Krapfl | 307/10.1 |
| 6,735,819 B2 * | 5/2004 | Iverson et al. | 16/4 |
| 6,777,060 B2 * | 8/2004 | Sehmer et al. | 428/95 |
| 6,817,649 B1 * | 11/2004 | Stanesic | 296/97.23 |
| 6,942,257 B2 * | 9/2005 | Wong et al. | 292/128 |
| 7,114,686 B2 * | 10/2006 | Andrigo | 248/71 |
| 7,172,162 B2 * | 2/2007 | Mizukoshi et al. | 248/68.1 |
| 7,353,571 B2 * | 4/2008 | Goldberg | 24/599.6 |
| D569,240 S * | 5/2008 | Aoki et al. | D8/382 |
| 7,449,228 B2 * | 11/2008 | Mason | 428/88 |
| 7,464,791 B2 * | 12/2008 | Cooksey et al. | 181/296 |
| 7,540,066 B2 * | 6/2009 | Aoki et al. | 16/4 |
| 7,546,661 B2 * | 6/2009 | Connor, Jr. | 16/4 |
| 7,628,447 B2 * | 12/2009 | Sugimoto et al. | 296/209 |
| 7,727,612 B2 * | 6/2010 | Haraguchi et al. | 428/99 |
| 7,784,238 B2 * | 8/2010 | Bannister | 52/465 |
| 7,891,927 B2 * | 2/2011 | Burger et al. | 411/546 |
| 7,945,992 B2 * | 5/2011 | Parisi et al. | 16/4 |
| 8,122,567 B2 * | 2/2012 | Connor, Jr. | 16/4 |
| D659,521 S | 5/2012 | Nagahori | |
| 8,402,605 B2 * | 3/2013 | Courtin et al. | 16/4 |
| 8,495,791 B2 * | 7/2013 | Yoon | 16/6 |
| 8,701,265 B1 * | 4/2014 | James | 29/525.01 |
| 2004/0080176 A1 * | 4/2004 | Haraguchi et al. | 296/97.3 |
| 2005/0253033 A1 * | 11/2005 | Mizukoshi et al. | 248/229.23 |
| 2007/0011844 A1 * | 1/2007 | Aoki et al. | 16/4 |
| 2009/0235485 A1 | 9/2009 | Connor, Jr. | |
| 2010/0122429 A1 * | 5/2010 | Gonzalez et al. | 16/4 |

\* cited by examiner

THREE PIECE FLOOR MAT RETENTION SYSTEM

CROSS REFERENCE TO RELATED APPLICATIONS

This application is a continuation of U.S. application Ser. No. 12/271,148 filed Nov. 14, 2008, the teachings of which are incorporated herein by reference.

FIELD

The present disclosure relates to vehicle floor coverings, and more particularly to a three piece system for retaining a floor mat to a floor carpet.

BACKGROUND

It is often desirable to place a floor mat on top of the carpet within a vehicle in order to keep the vehicle carpet clean and to reduce wear and tear thereof. Unfortunately, floor mats may be subjected to twisting motions from the entrance and exit of vehicle occupants which can cause slippage. Such slippage may lead to injury of an occupant when entering or exiting from a vehicle. In addition, a floor mat may slip over a vehicle carpet so as to become jammed under the accelerator, brake, or clutch pedals of the vehicle preventing proper operation thereof which may present a possibly dangerous condition.

A number of solutions have been proposed in the prior art to solve the problem of mat or rug slippage along a surface. These solutions can generally be divided among devices which hold the rug, mat, or carpet relative to an underlying floor and those which hold a rug or mat relative to an underlying carpet. In one instance, the floor mat may be sewn to the floor carpet, making it non-removable for cleaning. In another instance, a fastener was attached to the floor pan of the car and passed through holes in the carpet and mat to locate them. Attaching fasteners to the floor pan generally may cause problems with moisture leakage where the fastener is attached. Such fasteners may include an escutcheon to cover the end of the fastener which protrudes through the carpet.

Further, the floors of some vehicles, such as pick-up trucks, may be flat so that contoured mats may not be used. In some cases, two-sided tape may be used to secure a floor mat from slipping or the mat may include a retention system which is connected to the door sill.

SUMMARY

In a first aspect, the present disclosure is directed at a fastening system for attaching two layers together, comprising a first component including a base portion, a foldable arm, and a receiving portion to mechanically engage the foldable arm, and a projection to engage a second component. The second component includes a platform portion having a protrusion configured to mechanically engage with a third component. The third component includes a platform having a central opening, the opening configured to mechanically engage with the protrusion of the second component.

In a second aspect, the present disclosure is directed at a method of attaching two layers together comprising providing a fastener having three components, a first component including a base portion, a foldable arm, and a receiving portion to mechanically engage said foldable arm, and a projection to engage a second component. The second component includes a platform portion having a protrusion having an opening to engage the first component and the protrusion is configured to mechanically engage with a third component. The third component includes a platform having a central opening, the opening configured to mechanically engage with the protrusion of the second component. A first and a second layer may be provided, wherein the first layer includes openings to accommodate both the foldable arm as well as the receiving portion configured to ultimately mechanically engage with the foldable arm, wherein the second layer includes an opening for the protrusion.

One may then insert the foldable arm and the receiving portion through the openings in the first layer followed by folding of the arm such that it is mechanically engages with the receiving portion. This may then be followed by engaging the second component to the first component by inserting the projection into the opening in the second component and inserting the protrusion through the opening in the second layer and mechanically engaging the opening of the third component to the protrusion of the second component and securing the second layer to the first layer.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
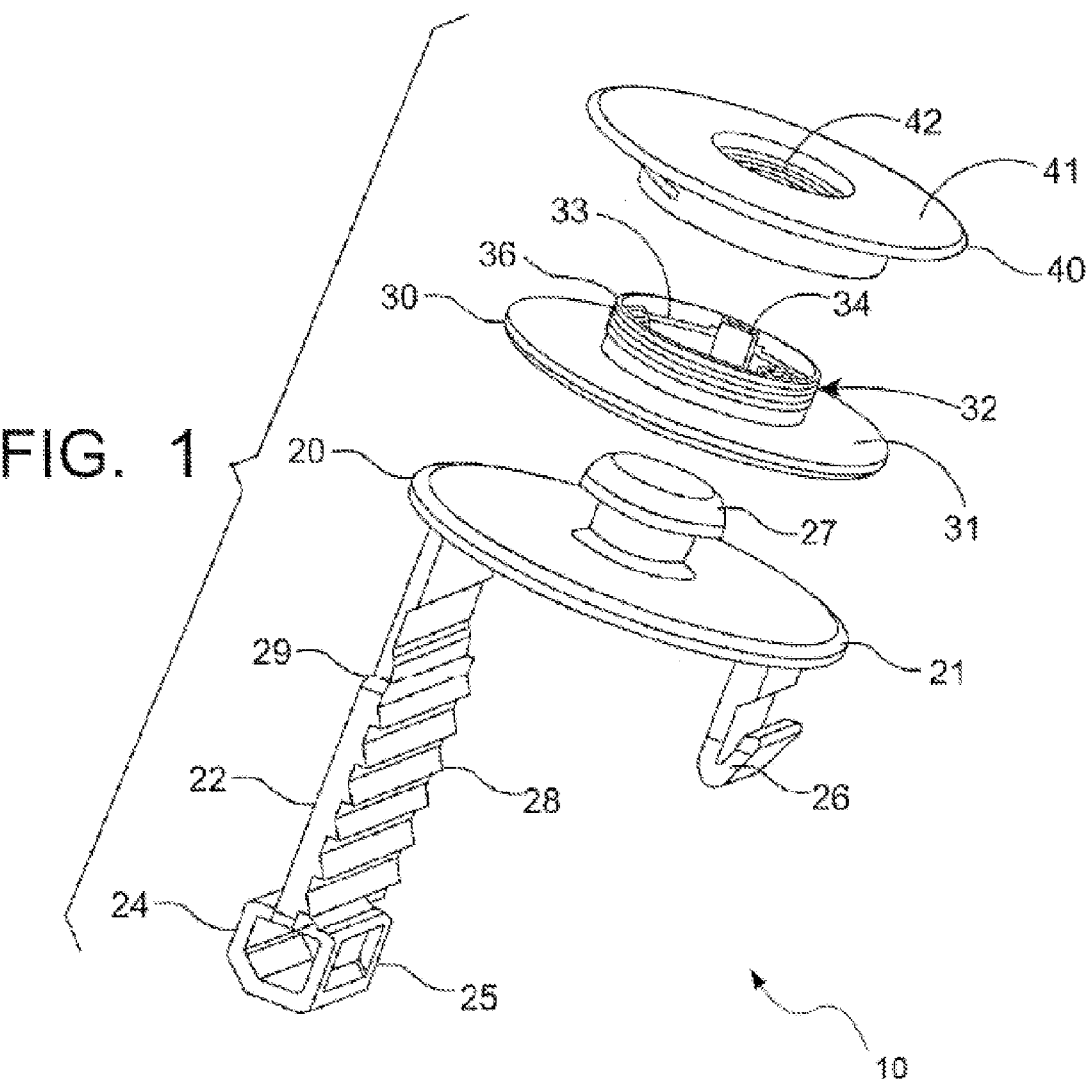
FIG. 1 is a perspective view of the three piece floor mat retention system in an exploded configuration showing the individual components.

As shown in FIG. 1, the snap retention system 10 of the present disclosure comprises three components, a first component 20 which includes a base portion 21, a foldable arm 22 and a receiving portion 26. The foldable arm 22 further may include a serrated portion 28 for engaging the backside of the carpet, a living hinge 29 and a connector portion 24 including an opening 25. In addition, the first component includes a projection 27 for engaging a second component 30 in mechanical engagement, such as a snap fit.

A second component 30 provides a platform 31, such as in the form of a round disc, having a protrusion 32 which may include a loop 33 and a plurality of molded detents 34 which extend into an opening and are spaced apart to interface with projection 27 in a mechanical type relationship (e.g. a snap-fit relationship) to engage the first component 20 and the second component 30 together. That is, the loop 33 may extend between the detents and is ultimately configured to be under tension when engaged with the edges of the projection 27. It may therefore be appreciated that any form of mechanical engagement of the second component with the first component is contemplated herein, such as a friction and/or threaded type engagement.

Figure 2:
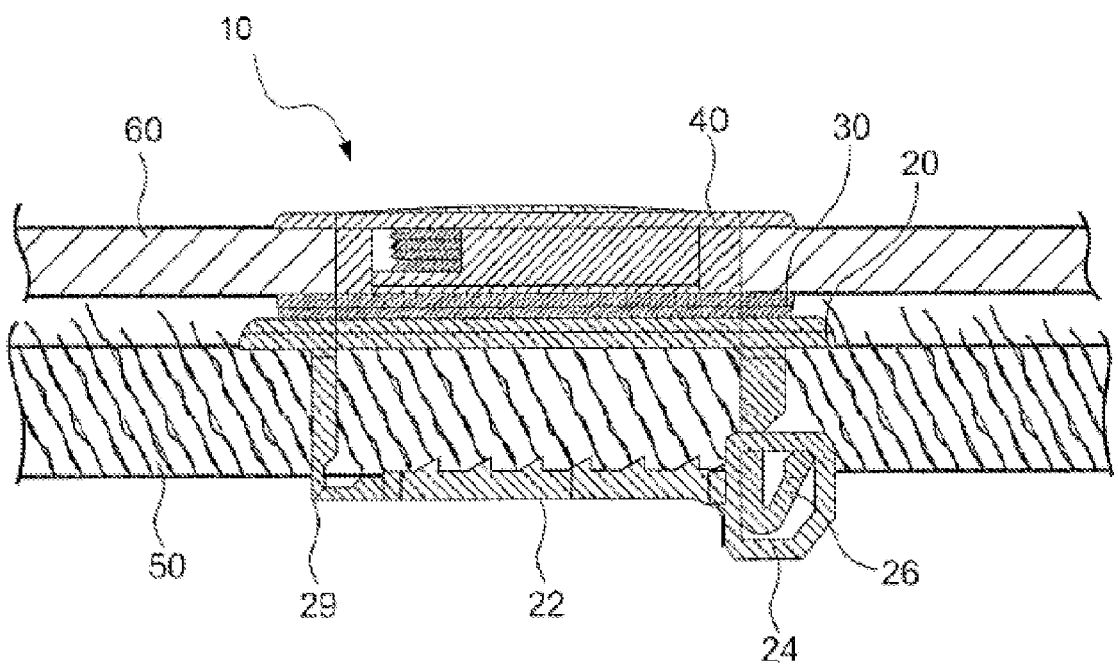
FIG. 2 is a perspective view of the three piece floor mat retention system in an installed position attaching a floor mat to a carpet.

The connection of the first component to the second component may then allow for retaining a floor mat between the second component 30 and a third component 40 (see FIG. 2) while the third component 40 provides retention of the mat to the carpet. The second component 30 may also include an external threaded portion on the protrusion 32 which may engage an internal threaded portion 42 of the third component 40. The third component may therefore provide a platform 41 which may also be in the shape of a round disc. It may also be appreciated that any form of mechanical engagement of the second component to the third component is contemplated herein, such as the above described threaded engagement and/or snap-fitting methods.

To install the retention system 10, two slots, not shown, may be cut into a carpet 50 and the receiving portion 26 and foldable arm 22 may be passed through the slots and the arm folded beneath the carpet around living hinge 29, such that the opening 25 in the connector portion 24 engages the receiving portion 26 and retains the first component 20 to the carpet 50. See FIG. 2. The receiving portion may therefore be understood as any feature (e.g. a hook) that may provide mechanical engagement to a foldable arm, which mechanical engagement may proceed via use of a connector portion 24 configured on the end of the foldable arm.

This then secures the first component 20 to the carpet 50. The serrated portion 28 of the foldable arm 22 may be designed, according to the thickness of the carpet and the length of the portion of the foldable arm above its hinge point, to penetrate a desired amount into the backside of the carpet. This may then provide additional stability for the connector when attached to a floor mat.

Next, the second component 30 may be snap-fit to the first component 20 by pressing the second component 30 over the projection 27 and engaging the projection with the molded detents 34 and loop 33 inside the opening in the second component 30.

Next, a floor mat 60 having a hole (not shown) to accommodate the protrusion 32 may be provided and slipped over the protrusion. This may be followed by threading the third component 40 via the internal threads 42 and external threads 36 on to the second component 30 securing the floor mat to the carpet. The third component 40 may include designs, logos, etc. on the top surface to provide aesthetics, as it is exposed to view.

The three components 20, 30 and 40 may generally be molded of a thermoplastic or thermoset (crosslinked) material. For example, suitable thermoplastics may include polyethylene and/or polypropylene. In the case of polypropylene, such may provide for the preferred formation of the living hinge noted above, but it may be appreciated that the hinge may be made of materials other than polypropylene. Reference to living hinge may be understood as a hinge that may be repeatedly flexed without failure. Continuing, other suitable thermoplastics may include polyamides (e.g., nylon-6,6 or nylon-6), ABS, polystyrene, high-impact polystyrene, thermoplastic olefins (TPO), polycarbonate (PC), poly(ethylene terephthalate), poly(butylene terephthalate), polysulfones, etc. One may also utilize elastomeric materials, e.g., thermoplastic polyester elastomers and/or polyurethane elastomers, etc. With respect to thermosets, one may consider the use of epoxy resins, phenolic resins, and/or crosslinked polyurethane systems.

While the connector described herein may be of nearly any practical size, generally it may be about 1 inch in diameter. It is also contemplated that the connector may have a diameter (largest cross-sectional linear dimension) of about 1.0 inch to 6.0 inches. The three piece floor mat snap retention system 10 as described herein may therefore provide a relatively simple and cost effective solution to stabilize a floor mat on a selected surface, such as a carpeted surface in a vehicle.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. A method of attaching two layers together comprising providing a fastener having three components,
   a. a first component including a base portion, a foldable arm, and a receiving portion comprising a U-shaped hook portion configured to mechanically engage an opening defined by an enclosed frame in a connector portion of said foldable arm, and a projection having an edge to engage a second component in a snap-fit relationship, wherein a terminal end of the U-shaped hook portion is contained within the enclosed frame when mechanically engaging the opening;
   b. a second component including a platform portion having a protrusion having an opening to engage said first component and said protrusion is configured to mechanically engage with a third component by threaded engagement;
   c. a third component including a platform having a central opening, said opening configured to mechanically engage with said protrusion of said second component by threaded engagement;
   d. providing a first and a second layer, wherein said first layer includes a first opening and a second opening to accommodate said foldable arm and said receiving portion of said first component, respectively, and wherein said second layer includes an opening for said protrusion of said second component;
   e. inserting said foldable arm and said receiving portion through said first and second openings in said first layer and folding said arm such that said hook portion of said receiving portion mechanically engages said opening defined in said connector portion of said foldable arm, thereby securing said first component to said first layer and wherein said first layer overlies said mechanical engagement of said hook portion and said opening and said engagement is visible from a backside of said first layer;
   f. engaging said second component to said first component by inserting said projection of said first component into said opening in said second component;
   g. inserting said protrusion of said second component through said opening in said second layer; and
   h. mechanically engaging said opening of said third component to said protrusion of said second component by rotationally threading the third component and second component to one another; and
   i. securing said second layer to said first layer.

2. The method of claim 1 wherein said second component protrusion includes a plurality of detents for engaging the projection of said first component.

3. The method of claim 1 wherein said second component protrusion includes external threads for mechanically engaging said third component.

4. The method of claim 3 wherein said third component includes internal threads which may engage said external threads of said protrusion.

5. The method of claim 4 wherein said two layers comprise a vehicle floor mat and vehicle carpeting.

6. The method of claim 1 wherein said first, second and third components comprise a thermoplastic or thermoset material.

7. The method of claim 1 wherein said foldable arm includes a living hinge portion.

8. The method of claim 1 wherein said first layer comprises vehicle carpeting and said second layer comprises a vehicle floor mat.

9. The method of claim 1 wherein said third component includes logos, indicia or decorative patterns.

* * * * *